(12) United States Patent
Ramler

(10) Patent No.: US 8,739,932 B2
(45) Date of Patent: Jun. 3, 2014

(54) AXLE LUBRICATION AND COOLING SYSTEM

(75) Inventor: Matthew John Ramler, Luxemburg, IA (US)

(73) Assignee: Deere & Company, Moline, IL (US)

( * ) Notice: Subject to any disclaimer, the term of this patent is extended or adjusted under 35 U.S.C. 154(b) by 509 days.

(21) Appl. No.: 13/093,646

(22) Filed: Apr. 25, 2011

(65) Prior Publication Data

US 2012/0266970 A1    Oct. 25, 2012

(51) Int. Cl.
*F15D 1/00*     (2006.01)
*F01M 5/00*     (2006.01)

(52) U.S. Cl.
USPC ........................ 184/6.22; 137/15.01; 137/544

(58) Field of Classification Search
USPC ............................... 184/6.22; 137/15.01, 544
See application file for complete search history.

(56) References Cited

U.S. PATENT DOCUMENTS

| | | | |
|---|---|---|---|
| 3,590,960 A | 7/1971 | Reynolds | |
| 3,949,844 A * | 4/1976 | Larson et al. | 188/264 P |
| 4,809,586 A * | 3/1989 | Gage et al. | 91/6 |
| 5,190,123 A | 3/1993 | Hvolka | |
| 6,096,199 A * | 8/2000 | Covington | 210/130 |
| 6,135,065 A * | 10/2000 | Weathers et al. | 123/41.31 |
| 6,199,663 B1 * | 3/2001 | Roy et al. | 184/55.1 |
| 7,028,810 B2 | 4/2006 | Coyle et al. | |
| 7,845,471 B2 | 12/2010 | Bares et al. | |
| 2004/0129514 A1 | 7/2004 | Spielman | |
| 2009/0050424 A1 | 2/2009 | Bares et al. | |

FOREIGN PATENT DOCUMENTS

| | | |
|---|---|---|
| EP | 1561963 A1 | 8/2005 |
| WO | 2006066146 A1 | 6/2006 |

* cited by examiner

*Primary Examiner* — William E Dondero
*Assistant Examiner* — Robert T Reese
(74) *Attorney, Agent, or Firm* — D'Hue Law LLC; Cedric D'Hue; Stephen Farris

(57) ABSTRACT

A hydraulic filtering, cooling and lubrication system is disclosed. The system is for use with a vehicle including an engine, a pump coupled to the engine and a plurality of axles. The system includes a separate manifold for each axle of the vehicle and/or each pair of wet disc brakes. Each manifold is separate from every other manifold to minimize cross contamination of axles.

20 Claims, 4 Drawing Sheets

AXLE LUBRICATION AND COOLING SYSTEM

FIELD

This disclosure pertains to separate oil circuits for lubricating and cooling components of a plurality of axles of a vehicle.

BACKGROUND

Many types of construction equipment use hydraulic oil circuits to lubricate and cool vehicle parts, such as wet disc brakes. As many types of construction equipment include a plurality of vehicle parts which require oil for lubrication and/or cooling, construction equipment utilizes a plurality of hydraulic oil circuit arrangements for delivering oil. For example, some types of construction equipment utilize wet disc brakes which use hydraulic oil circuits as part of the wet disc brake cooling and lubricating system. Oil used in wet disc brakes can become contaminated with wear particles. Contaminated oil that circulates could cross contaminate a plurality vehicle parts.

SUMMARY

In an exemplary embodiment of the present disclosure, a hydraulic filtering, cooling and lubrication system is disclosed. The system is for use with a vehicle including an engine, a pump coupled to the engine and a plurality of axles. The system comprises a manifold in fluid communication with the pump and an axle, a filter coupled to the manifold, a filter differential bypass in communication with the filter, wherein the filter differential bypass is configured to open and provide oil directly to the axle during a cold start of the engine, if the filter is plugged, or any consistent period of time when the pressure across the filter exceeds a predetermined pressure, a plurality of control valves downstream of the filter, wherein the filter differential bypass routes oil away from the plurality of control valves during a cold start of the engine, if the filter is plugged, or any consistent period of time when the pressure across the filter exceeds a predetermined pressure, the manifold in fluid communication with a heat exchanger of the vehicle, the manifold including a heat exchanger supply passage for supplying oil to the heat exchanger, the manifold including a heat exchanger return passage for returning oil from the heat exchanger, the manifold including an axle supply passage for supplying oil to the axle, the oil configured to lubricate and cool the axle or wet disc brakes of the axle, the manifold including an axle return passage for returning oil from the axle, at least one of the plurality of control valves configured to circulate returning oil through the manifold, and wherein the manifold is a closed oil circuit separated from any other manifold or axle.

In another exemplary embodiment of the present disclosure, a hydraulic filtering, cooling and lubrication system is disclosed. The system is for use with a vehicle including an engine, a pump coupled to the engine and a plurality of axles. The system comprises a first hydraulic oil circuit in fluid communication with a first set of brakes of a first axle, the first hydraulic oil circuit associated with a heat exchanger, the first hydraulic oil circuit for lubricating and cooling the first set of brakes of the first axle, wherein a portion of the first hydraulic oil circuit is enclosed in a first manifold, a second hydraulic oil circuit in fluid communication with a second set of brakes of a second axle, the second hydraulic oil circuit associated with the heat exchanger, the second hydraulic oil circuit for lubricating and cooling the second set of brakes of the second axle, wherein a portion of the second hydraulic oil circuit is enclosed in a second manifold, a third hydraulic oil circuit for lubricating the third axle, wherein a portion of the third hydraulic oil circuit is enclosed in a third manifold, wherein the first, second, and third hydraulic oil circuits are separate from each other.

In yet another exemplary embodiment of the present disclosure, a method of filtering, cooling or lubricating a plurality of wet disc brakes or a plurality of axles of a vehicle is disclosed. The method comprises the steps of providing a manifold including a filter, at least one differential bypass, at least one control valve, a heat exchanger supply passage for supplying oil to a heat exchanger of the vehicle, a heat exchanger return passage for returning oil from the heat exchanger, an axle supply passage for supplying oil to the axle, and an axle return passage for returning oil from the axle, passing oil through the filter of the manifold or bypassing the filter to provide oil directly to the axle during a cold start of an engine of the vehicle, if the filter is plugged, or any consistent period of time when the pressure across the filter exceeds a predetermined pressure, passing oil through the heat exchanger of the vehicle or bypassing the heat exchanger by use of a hydraulic check valve, wherein the hydraulic check valve is configured to allow oil to bypass heat exchanger during cold start or when oil pressure might exceed a predetermined force, providing oil to a pair of wet disc brakes or an axle of a vehicle, and providing a separate manifold for each pair of wet disc brakes or for each axle of the vehicle, wherein each of the separate manifolds is a closed oil circuit which are separated from each of the other manifolds.

BRIEF DESCRIPTION OF THE DRAWINGS

The above-mentioned and other features of this disclosure, and the manner of attaining them, will become more apparent and the disclosure itself will be better understood by reference to the following description of embodiments of the disclosure taken in conjunction with the accompanying drawings, wherein.

Figure 1:
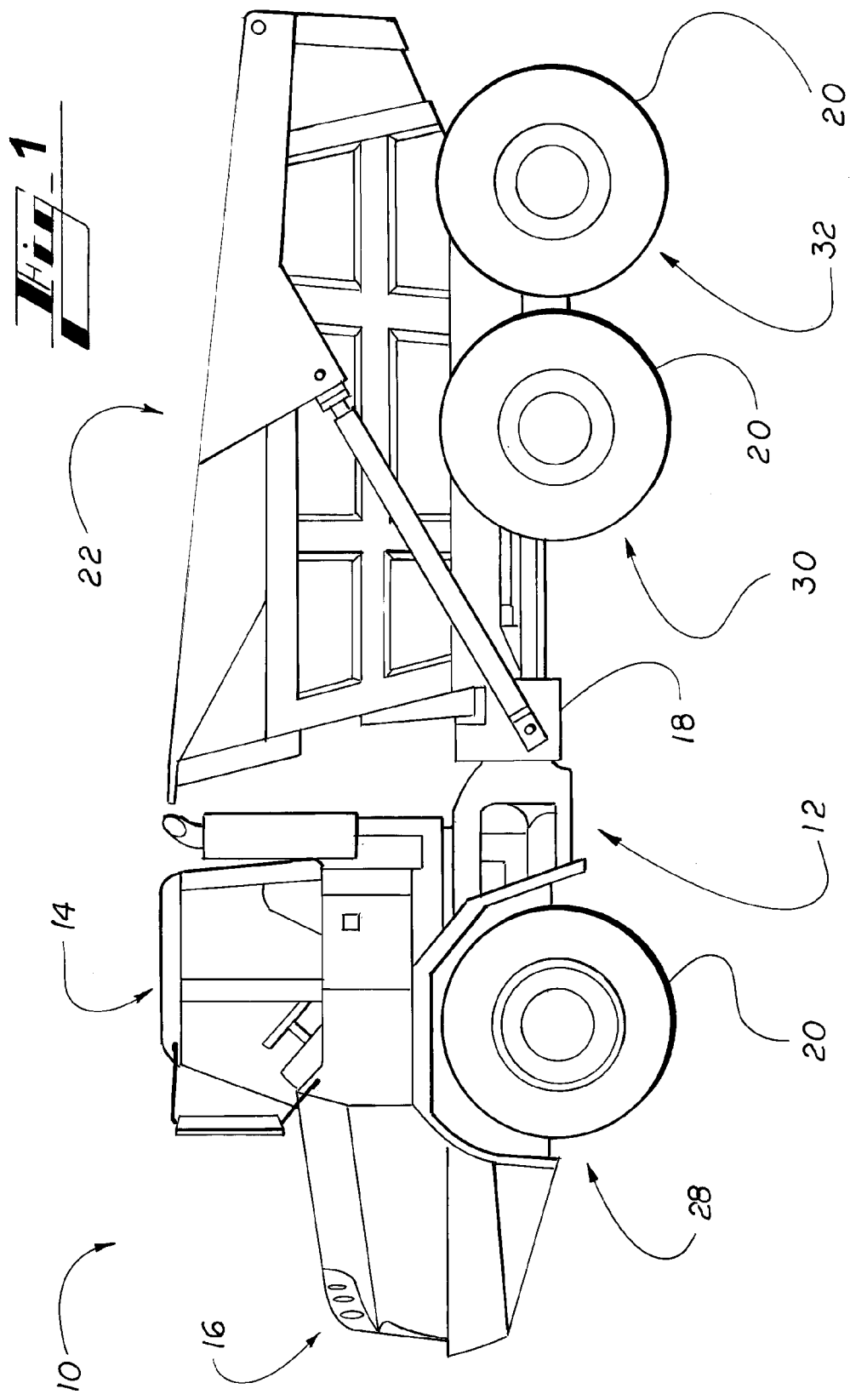
FIG. 1 is a side view of an exemplary vehicle, an articulated dump truck.

Corresponding reference characters indicate corresponding parts throughout the several views. Although the drawings represent embodiments of the present disclosure, the drawings are not necessarily to scale and certain features may be exaggerated in order to better illustrate and explain the present disclosure.

DETAILED DESCRIPTION OF THE EXEMPLARY EMBODIMENTS

The embodiments disclosed below are not intended to be exhaustive or limit the disclosure to the precise forms disclosed in the following detailed description. Rather, the embodiments are chosen and described so that others skilled in the art may utilize their teachings.

Figure 2:
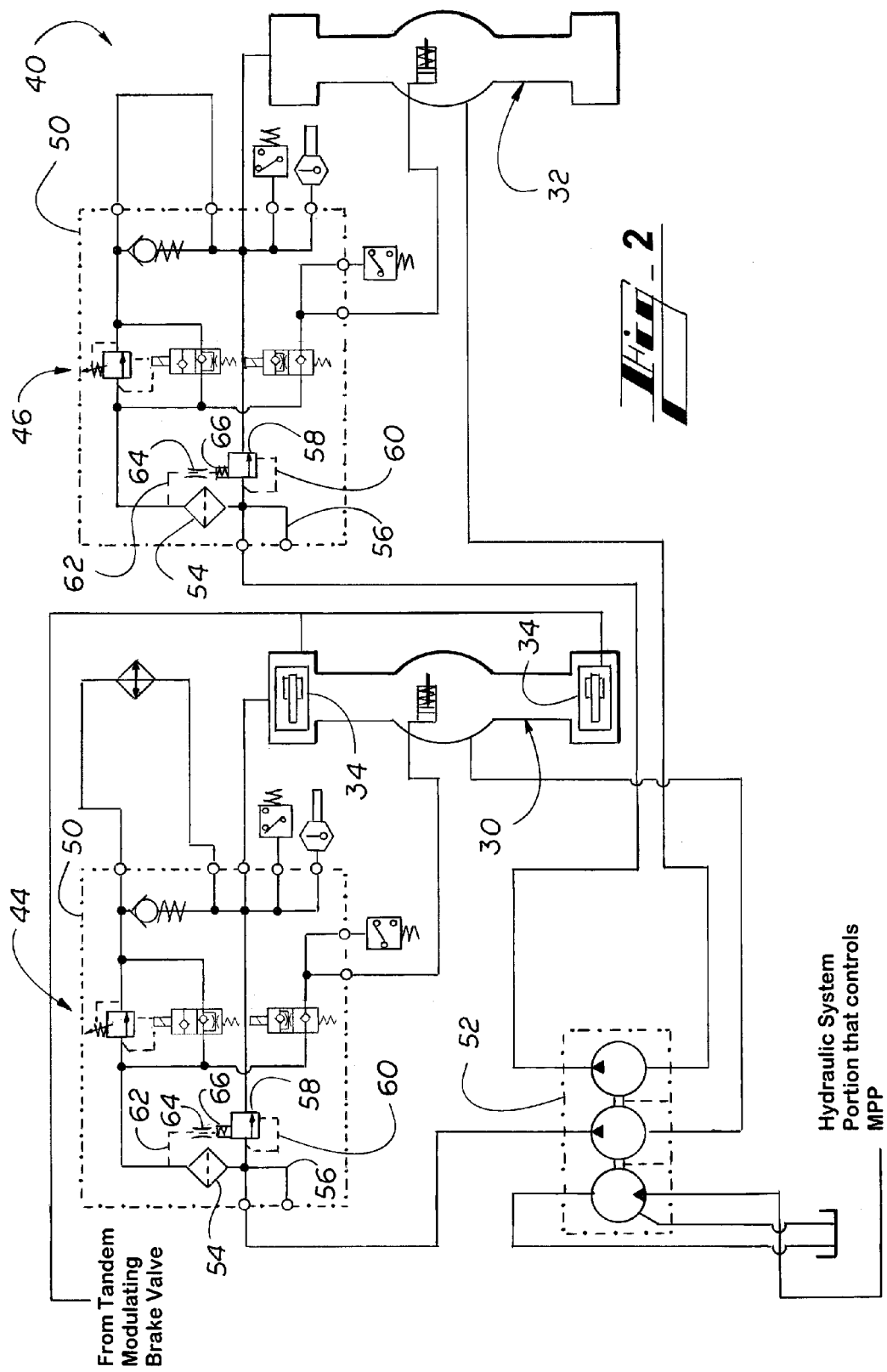
FIG. 2 is a schematic of an axle lubrication and cooling system of the present disclosure configured for use with the vehicle of FIG. 1.
Figure 3:
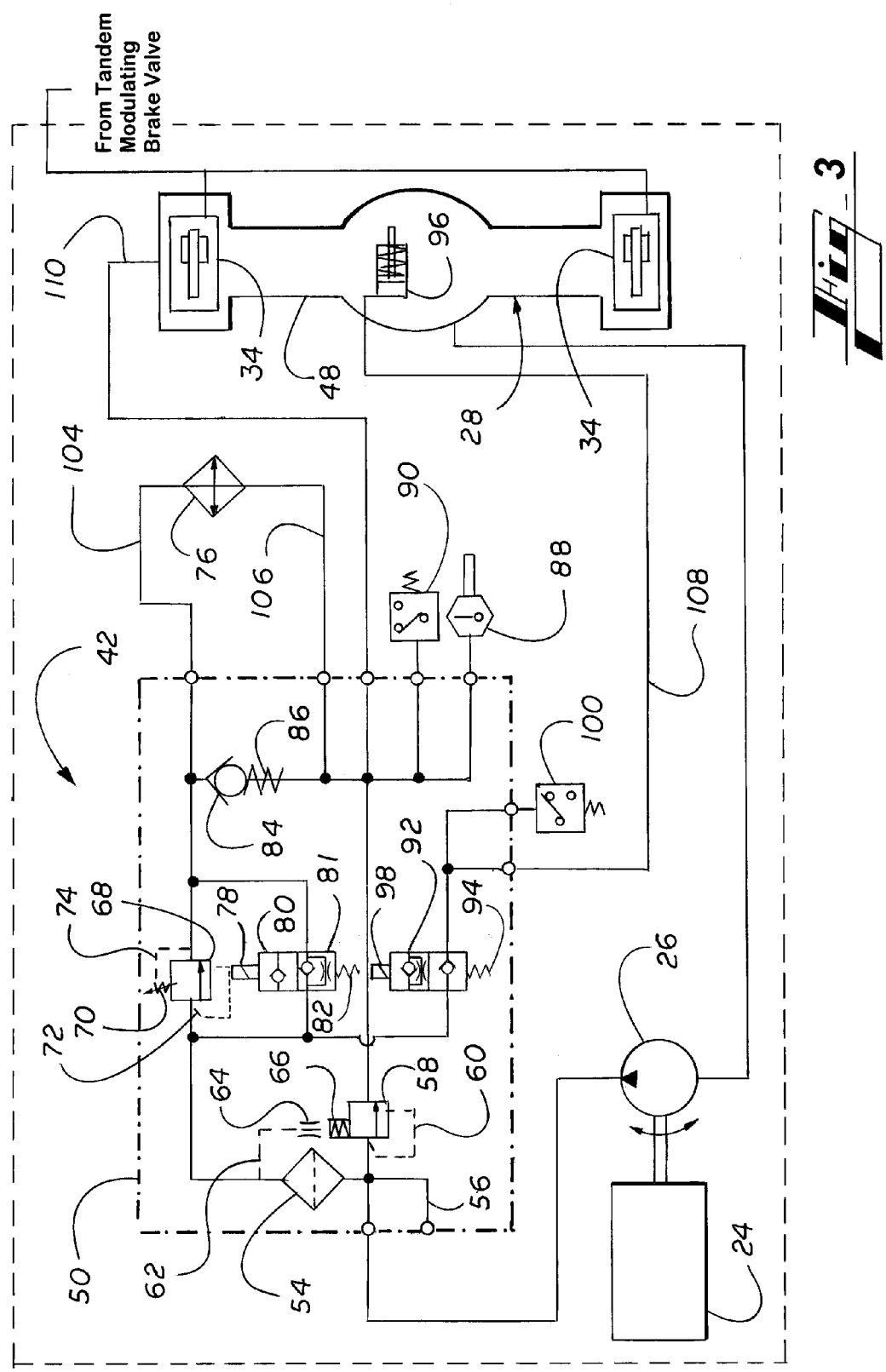
FIG. 3 is a magnified view of a portion of the schematic of FIG. 2 which illustrates one hydraulic oil circuit of the present disclosure.

Vehicle 10, illustrated as construction equipment such as articulated dump truck 10, is shown in FIG. 1. Vehicle 10 includes frame 12, cabin 14, engine compartment 16, drive system 18 including wheels 20 and dump body 22. Cabin 14, engine compartment 16, drive system 18 and dump body 22 are all supported by frame 12. Engine compartment 16 holds engine 24 (FIG. 3) and gear pump 26 (FIG. 3). Drive system 18 includes three axles 28, 30, 32 and three pairs of wheels 20. As illustrated in FIGS. 2 and 3, first axle 28 and second axle 30 each include wet disc brakes 34 while third axle 32 does not include wet disc brakes 34.

As best illustrated in FIG. 3, a schematic of axle lubrication and cooling system 40 is shown. System 40 includes a plurality of hydraulic and electronic components. As illustrated in FIGS. 2 and 3, system 40 includes a plurality of hydraulic oil circuits 42, 44, 46. System 40 includes gear pump 26 which is driven by engine 24. Gear pump 26 is a device configured to move fluids by either physical or mechanical action.

Gear pump 26 is configured to move oil through system 40. Gear pump 26 draws oil from center housing 48 of first axle 28. Gear pump 26 supplies oil to first manifold 50 which supplies oil to first wet disc brake 34 of first axle 28. Second axle 30 and third axle 32 supply oil to motor-pump-pump 52 which is powered by a main hydraulic system. Similar to gear pump 26, motor-pump-pump 52 provides oil under pressure compensated constant flow to second wet disc brake 34, second axle 30 and third axle 32. Motor-pump-pump 52 includes sections that are entirely sealed and sectioned off from one another. Between each section there are two shaft seals to minimize oil transfer between first, second and third axles 28, 30, 32. Separated hydraulic oil circuits 42, 44, 46 perform an additional purpose of maintaining a constant oil level in each of first, second and third axles 28, 30, 32. A constant oil level supports low windage, and efficient lubrication and cooling of each of first, second and third axles 28, 30, 32 as well as the first wet disc brakes 34 and the second wet disc brakes 34.

Schematics of first manifold 50 are illustrated in FIGS. 2 and 3. As best illustrated in FIG. 3, gear pump 26 supplies oil to first axle 28 through first manifold 50. First manifold 50 includes filter 54. As an exemplary embodiment filter 54 is a bowl and element type cartridge. As another exemplary embodiment filter 54 is a spin-on type cartridge. Filter 54 can also be adapted for use at high temperature. Oil sampling port 56 is in fluid communication with filter 54.

First manifold 50 also includes differential bypass 58 with filter-in measurement line 60 and filter-out measurement line 62 with fixed orifice 64. During normal operation, differential bypass 58 is closed and oil is forced through filter 54 and downstream to a plurality of components. During cold starts, under conditions when filter 54 is plugged, or any consistent period of time when the pressure differential between filter-in and filter-out exceeds a predetermined pressure, such as forty-four (44) psi, differential bypass 58 overcomes spring 66. Then differential bypass 58 opens and provides oil to first axle 28 to maintain constant lubrication pressure and constant oil level. Open differential bypass 58 also helps avoid contamination of the plurality of components which are downstream of filter 54, such as differential lock activators 90, 100 and pressure control valves 80, 92.

The plurality of downstream components includes heat exchanger differential bypass 68, and pressure control valves 80, 92. Heat exchanger differential bypass 68 includes adjustable spring 70, bypass-in measurement line 72 and bypass-out measurement line 74. During any period of time when the pressure differential between bypass-in 72 and bypass-out 74 exceeds force of adjustable spring 70, heat exchanger differential bypass 68 opens and provides oil to heat exchanger 76 through heat exchanger supply passage 104. Electric switch 78 activates pressure control valve 80 to close. In closed operation, pressure control valve 80 restricts oil passage to heat exchanger 76. Pressure control valve 80 is biased by spring 82 to allow oil to pass through to heat exchanger 76. Spring 82 can have any force. Pressure control valve 80 also includes leak line 81 with fixed orifice 64.

After oil passes pressure control valve 80 or differential bypass 58, oil may flow through heat exchanger 76 (also described herein as cooler). Hydraulic check valve 84 is spring biased to prevent oil from bypassing heat exchanger 76. Spring 86 of hydraulic check valve 84 may have any force. For example, spring 86 may have force equivalent to seventy-five (75) psi. Hydraulic check valve 84 is configured to allow oil to bypass heat exchanger 76 during cold start conditions or when oil pressure might exceed a predetermined force, such as seventy-five (75) psi, which might cause line rupture. Temperature sensor 88 may also determine working conditions of heat exchanger 76, such as the rate of speed of a fan of heat exchanger 76.

After oil passes through heat exchanger 76 through heat exchanger return passage 106 or after oil bypasses heat exchanger 76 but before oil proceeds to first axle 28, differential lock switch 90 may obstruct oil from proceeding to first axle 28. Oil may then proceed to first axle 28 through axle supply passage 110 and in order to lubricate or cool wet disc brake 34 or first axle 28.

After oil has performed the task of lubricating and/or cooling, oil is in first axle 28. Oil that is in first axle 28 may circulate to manifold 50 through axle return passage 108 to repeat the steps of lubricating and/or cooling. Oil can proceed to pressure control valve 92 of manifold 50. Pressure control valve 92 is biased by spring 94 to obstruct oil from passing from cylinder 96 of first axle 28 to the rest of first manifold 50. Electric switch 98 activates pressure control valve 92 to open allowing oil from cylinder 96 of first axle 28 to proceed through pressure control valve 92. Differential lock switch 100 must also be open to allow oil in cylinder 96 to proceed through pressure control valve 92. Oil that is in first axle 28 may circulate to gear pump 26 to repeat the steps of filtering, cooling, and/or lubricating.

Figure 4:
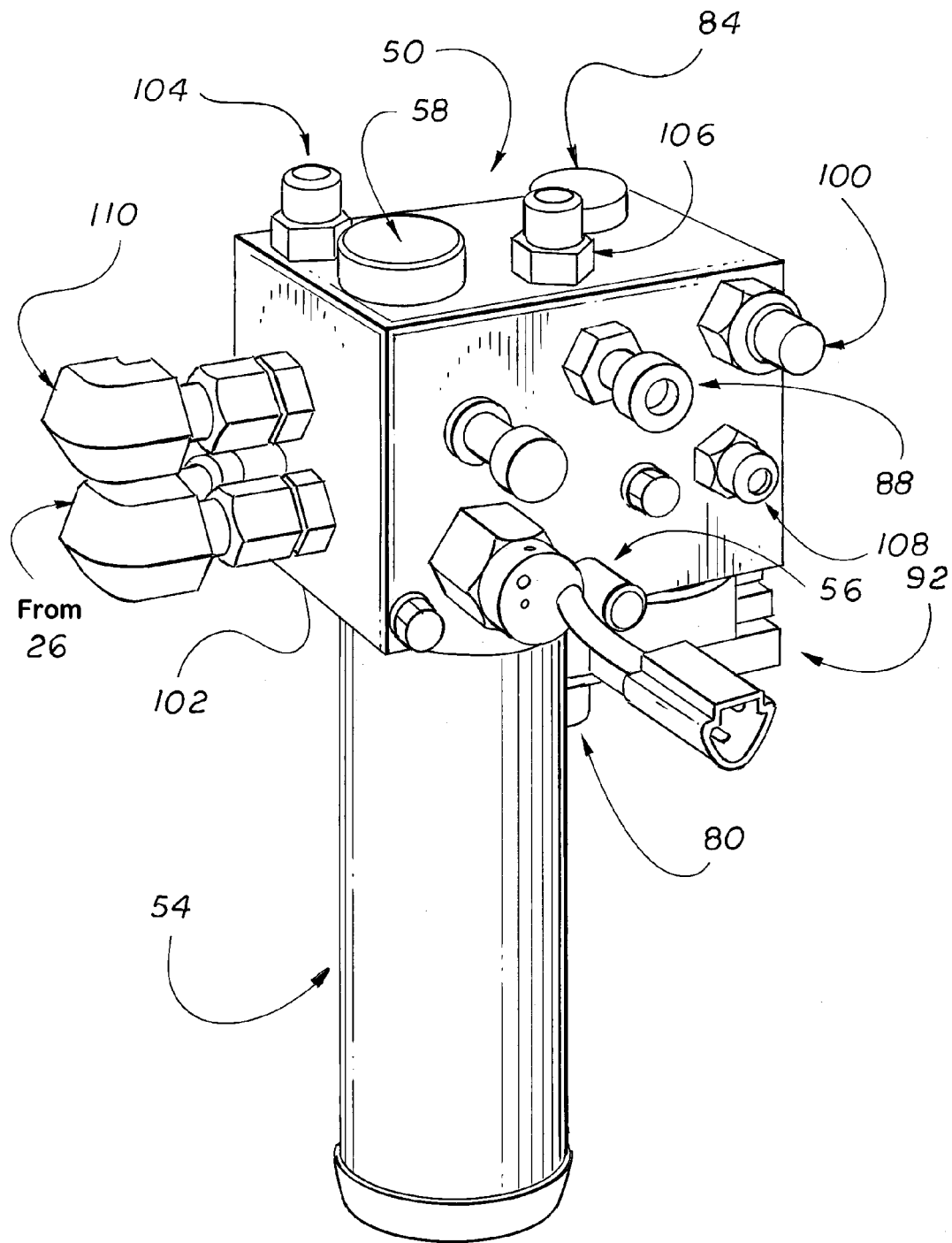
FIG. 4 is a perspective view of a manifold which exemplifies the magnified portion of the schematic of FIG. 3.

As best illustrated in FIG. 4, filter 54 can be directly mounted to manifold 50. As an exemplary embodiment, filter 54 can be mounted to bottom 102 of manifold 50. Filter 54 is configured to minimize contamination downstream of filter 54. For example, filter 54 obstructs contaminated oil or viscous oil or wear particles from reaching a plurality of components.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A hydraulic filtering, cooling and lubrication system for use with a vehicle including an engine, a pump coupled to the engine and a plurality of axles, the system comprising:
   a manifold in fluid communication with the pump and an axle, the manifold located downstream of the pump and upstream of the axle,
   a filter coupled to the manifold,
   a filter differential bypass in communication with the filter, wherein the filter differential bypass is located within the manifold and is configured to open and provide oil directly to the axle during a cold start of the engine, if the filter is plugged, or any consistent period of time when the pressure across the filter exceeds a predetermined pressure, a plurality of control valves downstream of the filter, the plurality of control valves located within the manifold, wherein the filter differential bypass is configured to route oil away from the plurality of control valves during a cold start of the engine, if the filter is plugged, or any consistent period of time when the pressure across the filter exceeds a predetermined pressure, the manifold in fluid communication with a heat exchanger of the vehicle, the manifold including a heat exchanger supply passage for supplying oil to the heat exchanger, the manifold including a heat exchanger return passage for returning oil from the heat exchanger, the manifold including an axle supply passage for supplying oil to the axle, the oil configured to lubricate and cool the axle or wet disc brakes of the axle, the manifold including an axle return passage for returning oil from the axle, at least one of the plurality of control valves configured to circulate returning oil through the manifold, and wherein the manifold is a closed oil circuit separated from any other manifold or axle.

2. The system of claim 1, wherein the filter is a bowl and element type cartridge.

3. The system of claim 1, wherein the filter is a high temperature filter.

4. The system of claim 1, wherein the filter is directly mounted to the bottom of the manifold.

5. The system of claim 1, wherein the plurality of control valves includes pressure control valves and at least one differential lock activator.

6. The system of claim 5, wherein the pressure control valves detect whether sufficient pressure is being supplied to the axle.

7. The system of claim 5, wherein the pressure control valves detect whether the differential lock activator has been activated.

8. The system of claim 1 further comprising a second manifold in fluid communication with a second axle of the vehicle, the second manifold in a second closed oil circuit from any other manifold.

9. The system of claim 8 wherein the second manifold is in fluid communication with a motor-pump-pump setup which separates oil in each manifold.

10. The system of claim 8 further comprising a third manifold in fluid communication with a third axle of the vehicle, the third manifold in a third closed oil circuit from any other manifold.

11. The system of claim 10 wherein the third manifold is in fluid communication with a motor-pump-pump setup which separates oil in each manifold.

12. A hydraulic filtering, cooling and lubrication system for use with a vehicle including an engine, a pump coupled to the engine and a plurality of axles, the system comprising:

a first hydraulic oil circuit in fluid communication with a first set of wet disc brakes of a first axle, the first hydraulic oil circuit associated with a heat exchanger, the first hydraulic oil circuit for lubricating and cooling the first set of we disc brakes of the first axle, wherein a portion of the first hydraulic oil circuit is enclosed in a first manifold, a second hydraulic oil circuit in fluid communication with a second set of wet disc brakes of a second axle, the second hydraulic oil circuit associated with the heat exchanger, the second hydraulic oil circuit for lubricating and cooling the second set of wet disc brakes of the second axle, wherein a porting of the second hydraulic oil circuit in enclosed in a second manifold, and a third hydraulic oil circuit for lubricating the third axle, wherein a portion of the third hydraulic oil circuit is enclosed in a third manifold, wherein the first, second, and third hydraulic oil circuits are separated from each other.

13. The system of claim 12, further comprising a plurality of hydraulic oil circuits, wherein the plurality of hydraulic oil circuits includes a separate hydraulic oil circuit coupled to each axle.

14. The system of claim 12, wherein each of the first manifold, the second manifold and the third manifold include a filter, a differential by pass in communication with the filter, and a control valve downstream of the filter.

15. A method of filtering, cooling or lubricating a plurality of wet disc brakes or a plurality of axles of a vehicle, the method comprising the steps of:

providing a manifold including a filter, at least one differential bypass, at least one control valve, a heat exchanger supply passage for supplying oil to a heat exchanger of the vehicle, a heat exchanger return passage for returning oil from the heat exchanger, and axle supply passage for supplying oil to the axle, and an axle return passage for returning oil from the axle, passing oil through the filter of the manifold or bypassing the filter to provide oil directly to the axle during a cold start of an engine of the vehicle, if the filter is plugged, or any consistent period of time where the pressure across the filter exceeds a predetermined pressure, passing oil through the heat exchanger of the vehicle or bypassing the heat exchanger by use of a hydraulic check valve, wherein the hydraulic check valve is configured to allow oil to bypass heat exchanger during cold start or when oil pressure might exceed a predetermined force, providing oil to a pair of wet disc brakes or an axle of a vehicle, and providing a separate manifold for each pair of wet disc brakes of for each axle of the vehicle, wherein each of the separate manifolds is a closed oil circuit which are separated from each of the other manifolds.

16. The method of claim 15, further comprising the step of directing oil from the axle of the vehicle to the manifold to repeat the steps of either passing oil through the filter or passing oil through the heat exchanger.

17. The method of claim 15, further comprising the steps of providing oil from a gear pump of the vehicle to the manifold.

18. The method of claim 15, further comprising the step of maintaining a constant oil level in each axle of the vehicle.

19. The method of claim 15, further comprising the step of providing a motor including a plurality of pumps which provides oil to each additional manifold.

20. The method of claim 19 wherein the motor including a plurality of pumps separates each manifold from each of the other manifolds.

* * * * *